Oct. 8, 1940.  W. S. CATHERWOOD, JR  2,217,511

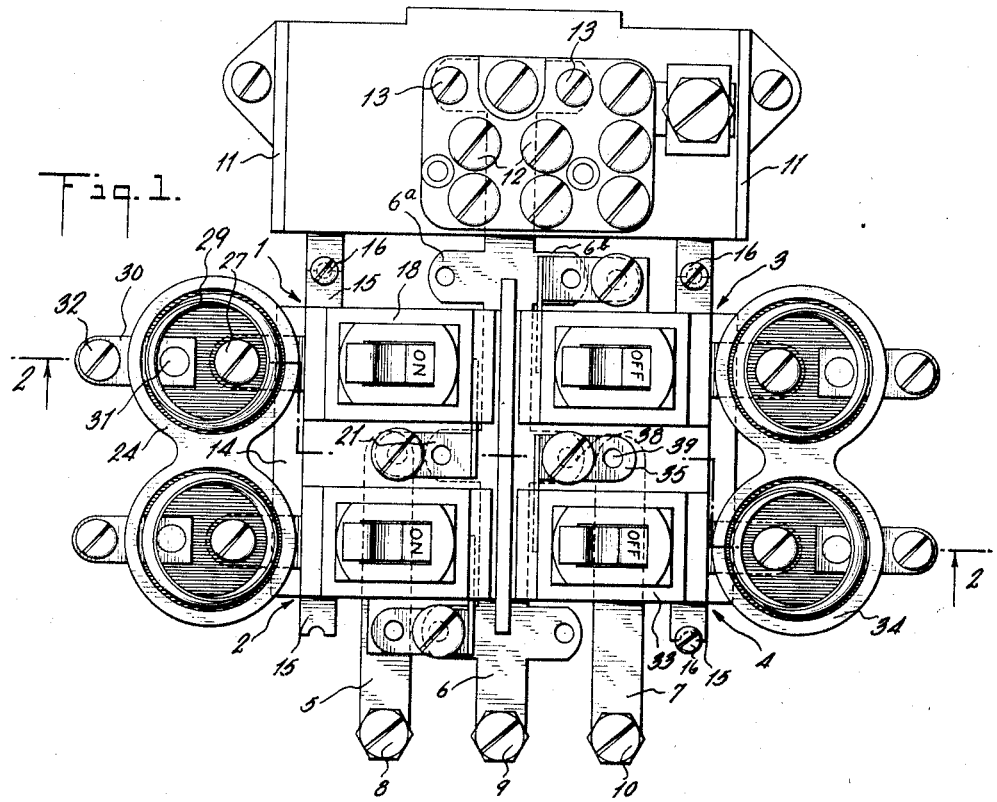

ELECTRICAL PANEL

Filed Jan. 9, 1940  2 Sheets-Sheet 2

INVENTOR.
WILLIAM S. CATHERWOOD JR.
BY
George T. Gill
ATTORNEY.

Patented Oct. 8, 1940

2,217,511

UNITED STATES PATENT OFFICE 2,217,511

ELECTRICAL PANEL

William S. Catherwood, Jr., Brooklyn, N. Y., assignor to Metropolitan Device Corporation, Brooklyn, N. Y., a corporation of New York Application January 9, 1940, Serial No. 313,022

2 Claims. (Cl. 175—371)

The invention herein disclosed relates to an electrical distribution panel for effecting connections from buses to branch circuit connectors through switches and fuses.

Many different electrical systems are in use at the present time among which are (1) the two wire, 120 volt system with unfused or solid neutrals; (2) the two wire, 120 volt system with all neutrals fused; (3) the three wire, 120-240 volt system with unfused neutrals; (4) the three wire, 120-240 volt system with all neutrals fused; (5) the three phase, 120-208, four wire system with unfused neutrals; (6) other polyphase combinations. In my co-pending application Serial No. 279,610, filed June 17, 1939, there is disclosed a fuse panel that is selectively connectable for use on any of the aforementioned systems. This fuse panel has selective connections such that it is feasible either at the factory, at the point of distribution or on the job to selectively arrange the connections of the panel for use on the particular system in which the panel is to be connected.

An object of the present invention is to provide a selectively connectable panel of this kind in which the circuits are connected to the buses through switches and fuses. Another object of the invention is to provide a selectively connectable panel of this kind and that is readily connected up for any one of the aforementioned systems with the switch for each branch circuit on the line side. A further object of the invention is to provide a panel of this kind that is compact, comparatively inexpensive to manufacture, readily assembled and readily and easily interconnected for any one of the several electrical systems.

Figures 3, 4:
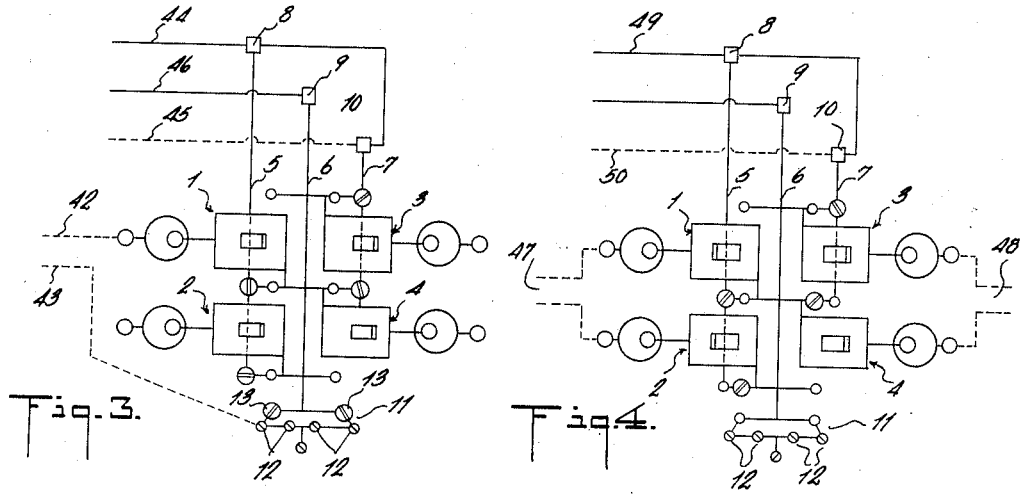
Figure 5:
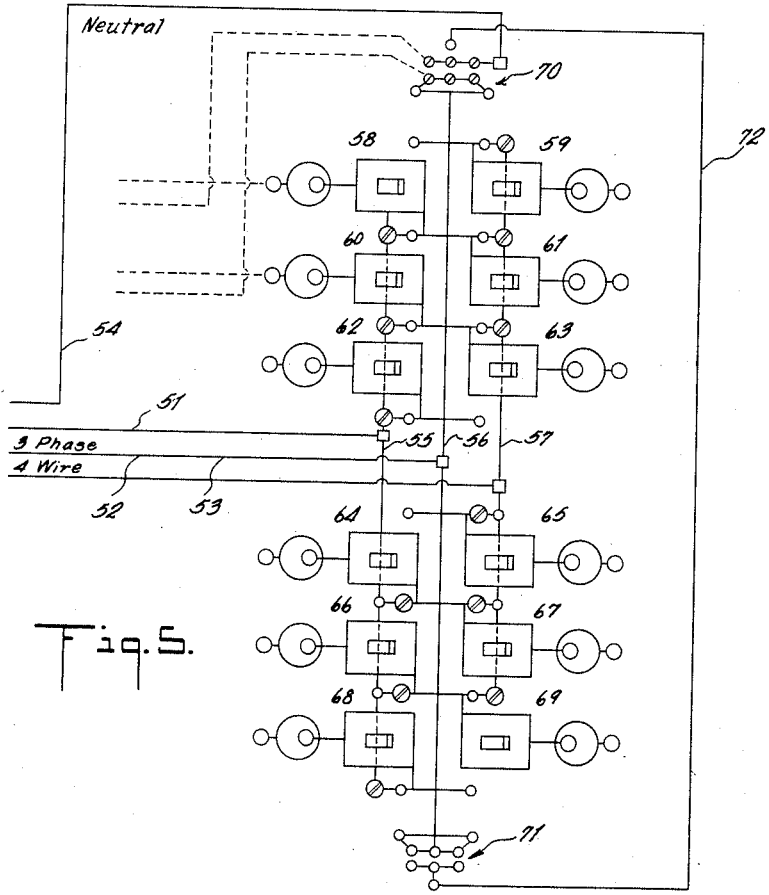

The foregoing objects and certain advantages that will hereinafter more fully appear are realized in the specific embodiment of the invention illustrated in the accompanying drawings and described in detail below. The drawings include:

Fig. 1 which is a plan of the fuse panel;

Fig. 2 which is a transverse sectional elevation of the same taken on the line 2—2 of Fig. 1;

Fig. 3 which is a wiring diagram of a fuse panel embodying the invention and arranged for a two wire, 120 volt supply with a solid neutral;

Fig. 4 which is a wiring diagram of the panel arranged for a two wire, 120 volt supply with a fused neutral; and Fig. 5 which is a wiring diagram of the panel arranged for a three phase, four wire, 120-208 volt supply with a solid neutral.

The distribution panel illustrated in Figs. 1 and 2 is a panel that is made up of a series of unit blocks, four in number, designated by the numerals 1, 2, 3 and 4. The several blocks are similar in construction and are designed to be mounted in a cabinet (not shown) and nested together side by side to form a panel. Any number of blocks may be used in a panel, the number for any particular panel being determined by the number of branch circuits to be supplied through the panel.

Underlying the several blocks, there are three buses 5, 6 and 7. The buses 5 and 7 are straight strips of copper of the type commonly employed in distribution panels. The bus 6 which is between the buses 5 and 7 has a series of extensions or lugs 6a and 6b formed thereon at spaced intervals. These lugs extend from opposite sides of the bus and underlie the blocks. The connection from the feed cables or line wires is made at one end of the panel. Such connections are made to the buses 5, 6 and 7 through clamp connectors indicated at 8, 9 and 10. At the opposite end of the panel, there is provided a connector block 11 through which branch circuit connections may be made to the central bus. This connector block is provided with a plurality of terminal screws 12 and is connected to the bus through two connecting screws 13.

The particular switch block illustrated is a quadruplex block, the individual blocks 1, 2, 3 and 4 having a common base. Each individual switch block may, however, be separate and individually secured in the cabinet. The switch block, which is illustrated in cross section in Fig. 2, includes a base 14 of insulating material. This base is provided with lugs 15, by means of which the block may be secured in place in a cabinet (not shown). The base of the block is secured in the cabinet by screws 16 which extend through the lugs at each side of the block and into threaded holes provided therefor in the cabinet. The base 14 includes a top or front 17 on which there is mounted, as a part of the block 1, a toggle switch 18. An extension having holes 19 and 20 therethrough is formed in the base beneath the block 1 and extends downwardly into the base from the under surface of the top 17. This extension is at one side of the switch 18. At the lower or rear end, the extension engages the bus 5 and a lug 6a of the bus 6. The bus 5 has a tapped hole therethrough aligned with the opening 19 through the extension and the lug 6a has a tapped hole therethrough aligned with the opening 20.

Above the openings 19 and 20 on the upper surface of the top 17, there is a connector plate 21 through which electrical connection is made to one side of the switch 18. This connector plate includes a flat section 22 which overlies the extension and which has openings therethrough that are aligned with the openings 19 and 20. A flange 22a extends from one end of the plate 21 and is electrically connected and secured to the switch 18 through a screw 23.

Adjacent the switch, there is a fuse receptacle 24 for a plug type fuse. From the switch 18, a connecting strip 25 extends into the receptacle. To one side of the center of the fuse receptacle and towards the switch, there is formed in the receptacle a boss 26. A central contact screw 27 is arranged on the boss and extends at 28 through the boss and the strip 25. The end of the screw 28 is threaded into strip 25 to effect a mechanical and electrical connection therewith. Within the fuse receptacle there is the usual screw shell 29 which is secured in place by, and electrically connected to a branch connector 30. A screw 31 is mounted in the base of the socket and extends through the branch connector 30, which overlies the base of the shell, and secures the branch connector to the base. The branch connector 30 is provided with a terminal screw 32.

The block 4, the section of the base underlying which is illustrated in section in Fig. 2, is identical with the block 1 and includes a switch 33 and a fuse receptacle 34. This switch and fuse receptacle combination is provided with a separate connector 35 (there being a like connector for each switch and fuse receptacle) which overlies an extension having holes 36 and 37 therethrough similar to the extension having the openings 19 and 20. The connector strip includes an opening 38 aligned with a tapped opening in the extension 6b of the central bus, and an opening 39 aligned with a tapped hole through the bus 7.

The blocks 1, 2, 3 and 4 may be molded together or have a common base as illustrated to form a quadruplex unit of four switch and fuse receptacle combinations or they may be constructed as duplex units or as separate units so that each block in itself constitutes a switch and fuse receptacle combination. In any event, each switch and fuse receptacle combination is an independent, electrically connected branch circuit, switch and fuse receptacle combination, separately connectable through its plate connector to the buses.

As previously stated, the connector 21 of the block 1 overlies the buses 5 and 6. A screw, such as the screw 40 when extending through the plate 21, the opening 19 and into the tapped opening in the bus 5 effects an electrical connection between the bus 5 and the switch 18 of the switch and fuse receptacle combination of the block 1. If the screw 40 be inserted through the opening 20 and threaded into the lug 6a of the bus 6, the switch and fuse receptacle combination of block 1 will then be connected to the bus 6. Similarly, depending upon whether a screw 41 is inserted through the opening 38 or 39 of the connector 35 and threaded into the extension 6b of the bus 6 or into the bus 7, the switch and fuse receptacle combination of block 4 will be connected to the bus 6 or the bus 7 respectively. In like manner each of the switch and fuse receptacle combinations in the panel is selectively connectable between the common bus 6 and one of the side buses 5 or 7. Half of the switch and fuse receptacle combinations of the panel are selectively connectable between the bus 6 and the bus 5. The other half of the switch and fuse receptacle combinations are selectively connectable between the bus 6 and the bus 7.

Each connecting screw has a head that extends beyond half the distance between the openings in a connector plate. Thus the head of the screw 40 extends beyond half the distance between the openings through the connector plate 21. In consequence, it is not feasible to have two connecting screws, one in each of the two openings, in a connector plate at the same time. The heads of the screws are of such thickness that if two be inserted in a connector plate one can not reach the bus.

In Fig. 3 there is illustrated diagrammatically a wiring diagram for the fuse panel described above. It will be seen that the bus connector screws in the blocks are arranged so that the blocks 1 and 3 are connected to the outside bus 5 and the blocks 2 and 4 are connected to the outside bus 7. This panel is thus arranged for a two-wire, 120 volt supply system with a solid or unfused neutral. The panel so connected with the feed buses 5 and 7 connected as indicated and the central bus 6 connected to the terminal block 11 through the screws 13 is suitable to supply four branch circuits, one of which has been indicated by the broken lines 42 and 43. In such a panel, connected in the system mentioned, one side of a branch circuit, the line 42 is connected to a branch circuit connector of the switch and fuse receptacle combination, and the other line, such as indicated by the line 43 is connected directly to the neutral through a terminal screw 12 on the connector block 11.

The switch and fuse receptacle combinations are connected to the buses in exactly the same manner for a three wire, 120–240 volt system with a solid unfused neutral. In such a system, however, the line wire 44 terminates in a connection with the bus 5 and the additional line wire 45, indicated by a broken line is connected to the bus 7. In this system the line wire 46, connected to the bus 6 is the neutral. The branch circuit connections to the panel are the same as described above for the two wire, 120 volt, solid neutral system.

The panel is illustrated diagrammatically in Fig. 4 arranged for a two wire, 120 volt supply with all neutrals fused. In this panel, the blocks 1 and 3 are connected respectively to the outside buses 5 and 7 and the blocks 2 and 4 are connected to the bus 6. The central or neutral bus 6 is in this arrangement disconnected from the terminal connector block 11 by the removal of the connector screws 13. So connected, each side of each branch circuit is fused, the panel being suitable for two branch circuits 47 and 48.

For a three wire, 120–240 volt fused neutral system, the switch and fuse receptacle combinations are connected to the buses as illustrated in Fig. 4. In this latter system, however, the line wire 49 (Fig. 4) is terminated in its connection to the bus 5 and the line wire 50, indicated in broken lines is connected to the bus 7. The branch circuit connections are the same for the three wire, 120–240 volt, fused neutral system as those illustrated in Fig. 4.

A panel similar to that shown in Fig. 1 but having twelve switch and fuse receptacle combinations and with the connections arranged for a three-phase, four-wire 120–208 volt system is illustrated in Fig. 5. Such a system includes three wires 51, 52 and 53 and a neutral 54. The wires 51, 52 and 53 are respectively connected to buses 55, 56 and 57 of the fuse panel. In this panel, the unit blocks are divided at the center of the panel. The panel thus includes two banks of three sets of duplex blocks, one bank including the blocks 58, 59, 60, 61, 62 and 63 and the other bank including the blocks 64, 65, 66, 67, 68 and 69. The line wires 51, 52 and 53 are connected to the buses 55, 56 and 57 at the center of the panel. A connector block 70 is provided at one end of the panel and another connector block 71 is provided at the other end of the panel. These connector blocks are disconnected from the bus 56 and the neutral 54 is connected to the terminal block 70 and to the terminal block 71 at the other end of the panel through a jumper 72.

The blocks 58, 60, 62 and 68 are connected to the bus 55. The blocks 59, 61, 63 and 69 are connected to the bus 57. The blocks 64, 65, 66 and 67 are connected to the bus 56. Each branch circuit includes one wire that is connected to a branch connector of a block on the panel and a wire that is connected directly to the neutral 54 through either the terminal block 70 or the terminal block 71. It will be obvious that as the blocks are connected as indicated in Fig. 5, the twelve circuits for which the panel is suitable are arranged so that four are taken from each of the buses 55, 56 and 57. Thus, the circuits that include the blocks 58, 60, 62 and 68 are taken from the bus 55 and in consequence, the main 51. The circuits that include the fuse receptacles 59, 61, 63 and 69 are taken from the bus 57 and in consequence the main 53. By virtue of the connections of the blocks 64, 65, 66 and 67 to the central bus 56, the four branch circuits that include these fuse receptacles are taken from the bus 56 and consequently the main 52.

From the foregoing, it will be seen that the panel described above is suitable for any one of the several systems now in use and provides a switch and fuse receptacle combination for each branch circuit with the switch on the line side of the fuse receptacle. Panels constructed as described above may be changed from an arrangement suitable for one system to another arrangement suitable for another system merely by changing the screws that connect the switch and fuse receptacle combination and the buses. This operation may be performed by the manufacturer or the distributor of the panels, upon order for a panel for a particular system, or it may be done on the job. This flexibility of arrangement and connection simplifies the construction of switch-fuse panels and materially reduces the number of sizes that need to be held in stock. The number of unit blocks in a panel and their connection to the buses will of course depend on the particular system with which the panel is used and the number of branch circuits. Also various combinations of fused and unfused neutrals may be made up by proper arrangement of the connector screws to meet particular conditions.

The arrangement also provides a compact panel. A standard plug fuse occupies a space of one and three-quarter inches. Within this space, in the arrangement illustrated there is arranged a switch and between two switch and fuse receptacle combinations a connector for a switch and fuse receptacle combination, the fuse receptacles being so close together as to leave only enough clearance for the insertion and removal of fuses. Several switch and fuse blocks nest together in this way and form a very compact panel.

It will be obvious that various changes may be made by those skilled in the art in the details of the embodiments of the invention illustrated in the drawings and described in detail above within the principle and scope of the invention as expressed in the appended claims.

I claim:

1. A distribution panel selectively connectable for several different electrical systems comprising in combination a plurality of branch circuit units each including a switch and a fuse receptacle, a plurality of buses underlying each of the units, and a selective connector associated with each unit comprising a connector strip having connector screw openings and a connector screw, the distance between centers of the openings and the diameter of the connector screw head being such that the head of the screw extends over half the distance between the screw openings.

2. A distribution panel selectively connectable for several different electrical systems comprising in combination a plurality of branch circuit units each including a switch and a fuse receptacle, a plurality of buses underlying each of the units, and a selective connector associated with each unit for effecting a connection with a bus comprising a connector strip having connector screw openings and a connector screw, the distance between the centers of the openings and the diameter and thickness of the connector screw heads being such that the connector strip is connectable to but one bus at a time.

WILLIAM S. CATHERWOOD, Jr.